United States Patent [19]

Baldyga

[11] Patent Number: 5,176,228
[45] Date of Patent: Jan. 5, 1993

[54] BRAKE ASSEMBLY FOR STRIP FEEDING DRIVE

[75] Inventor: Joseph Baldyga, Naples, Fla.

[73] Assignee: Diamond Die & Mold Company, Mt. Clemens, Mich.

[21] Appl. No.: 643,532

[22] Filed: Jan. 18, 1991

[51] Int. Cl.⁵ .......................................... B65H 59/10
[52] U.S. Cl. ....................................... 188/67; 188/43;
188/65.1; 188/72.7; 188/73.45; 188/166;
226/195; 242/75.2
[58] Field of Search ................. 188/166, 167, 67, 72.7,
188/65.1, 76, 73.45, 43, 44, 72.1; 226/195;
242/75.2

[56] References Cited

U.S. PATENT DOCUMENTS

| | | | |
|---|---|---|---|
| 1,177,707 | 4/1916 | Jones | 188/43 X |
| 1,539,754 | 5/1925 | McCullougho | 242/75.2 |
| 1,944,603 | 1/1934 | Hecker | 188/65.1 X |
| 2,268,685 | 1/1942 | Walther et al. | 188/76 |
| 2,765,468 | 10/1956 | Cootes et al. | 226/195 X |
| 3,187,829 | 6/1965 | Ulinski | 188/166 X |
| 3,253,451 | 5/1966 | Kerns | 72/331 |
| 3,331,474 | 7/1967 | Day | 188/76 |
| 3,463,274 | 8/1969 | Hollnagel et al. | 188/72.7 |
| 3,976,235 | 8/1976 | Baldyga | 226/11 |
| 3,977,587 | 8/1976 | Baldyga | 226/74 |
| 4,223,764 | 9/1980 | Flotow | 188/72.7 |

FOREIGN PATENT DOCUMENTS 1289769  9/1972  United Kingdom ................ 188/67

Primary Examiner—George E. A. Halvosa
Attorney, Agent, or Firm—Basile and Hanlon

[57] ABSTRACT

A self-containing brake assembly adapted to be mounted on a strip feeding device to apply an adjustable frictionally braking force to the strip includes a first braking element mountable upon a feed table. A second braking element having spaced opposed webs located at opposite sides of the first element is guided by guide pins fixed to one element and received in bores in the other for movement between a braking position wherein a work piece strip is frictionally gripped between one side of the first braking element and the opposed web of the second and a release position in which the opposed web is disengaged from the strip. An adjustable spring resiliently biases the elements towards the braking position an eccentric release cam may be manually operated to shift the elements to their release position.

3 Claims, 2 Drawing Sheets

BRAKE ASSEMBLY FOR STRIP FEEDING DRIVE

BACKGROUND OF THE INVENTION

The present invention relates to a brake assembly operable to apply an adjustable braking force to an elongate strip of work material movable longitudinally along a fixed path.

The brake assembly of the present invention is specifically designed for use in conjunction with a feeding mechanism employed to feed a continuous strip having electric terminals uniformly spaced along the strip in step-by-step movement to a die and punch mechanism where the terminals are severed from the strip and crimped upon the end of an electrical conductor. Such feed mechanisms are well known in the art, one example of such a feed mechanism being disclosed in U.S. Pat. No. 3,977,587.

In the feed mechanism shown in U.S. Pat. No. 3,977,587, the pins project a rachet tooth-like feeding lever 38 driven in reciprocatory movement along the feed path. The forward end of the rachet tooth is a flat surface which projects into driving engagement with a drive pin to positively drive the pin, and the terminal strip engaged with the pin, forwardly upon forward movement of the rachet. During its rearward stroke, a rearwardly inclined cam surface on the rachet slides beneath the next following drive pin, and a torsion spring then biases the rachet tooth back upwardly so that its flat forward surface will engage and drive this last pin during the next forward working stroke of the rachet.

Proper operation of a feed mechanism of this type relies upon minimal friction between the pins and the pin carrying chain and the pins and cam surface on the rachet tooth and proper adjustment of the rachet return spring. If these conditions are not maintained, the system can bind or jam on the return stroke of the rachet, and cause the strip to be fed in a reverse direction during the return stroke of the feed rachet. This can result in misalignment between terminals on the strip and the crimping die or in severe cases result in no feeding of the strip at all. U.S. Pat. No. 3,977,587 discloses a spring biased wedging cam which will resist reverse movement of the terminal strip while applying a relatively low friction braking action to forward movement of the strip.

The overall crimping apparatus is so designed that the crimping dies may be readily interchanged to enable the mechanism to operate upon different types of terminals. In that the spacing between the pin receiving bores of the carrier strip normally is the same for many different varieties of terminals, setup of the feed mechanism normally does not require any change when production is shifted from one type of terminal to another. However, carrier strip thickness can vary between different types of terminals, and the friction or one-way brake mechanism of the type disclosed in U.S. Pat. No. 3,977,587 typically is set up to handle strips of a single specific thickness.

The present invention is directed to a brake assembly for use in conjunction with feed systems of the general type referred to above which may be readily adjusted to regulate the braking force applied in a simple and efficient manner.

SUMMARY OF THE INVENTION

The present invention takes the form of a braking assembly which includes a first braking member adapted to be fixedly mounted upon a stationary element of a strip feed mechanism, and a second braking element which is mounted upon the first element for movement relative to the first element between a braking position and a release position. The first braking element is formed with horizontal top and bottom side surfaces, the top side surface slidably engaging the underside of the carrier strip which is to be braked, and a vertical edge surface extending parallel to the path of movement of the carrier strip. The second braking element is formed with generally horizontal upper and lower webs which project from one side of a vertical web which may be slidably engaged with the edge surface of the first brake element. The upper web of the second element overlies the top surface of the first element, and vertical guide pins projecting upwardly from the lower web of the second element are slidably received in vertical bores in the first element to guide the second element in movement relative to the first between a braking position in which the carrier strip is frictionally gripped between the top surface of the first element and the lower side of the upper web of the second element, and a release position in which the second element is elevated to a position clear of the carrier strip. The second element is biased to the braking position by compression springs engaged between the bottom surface of the first element and adjustment screws threadably received in tapped vertical bores through the lower web of the second element. The adjustment screws are employed to adjust the biasing force exerted by the springs, and so adjust the frictionally grip or braking force applied by the brake assembly to the carrier strip.

The vertical web of the second braking element is formed with a horizontally elongated opening which is aligned with a horizontal bore extending into the edge of the first braking element. A cam shaft is rotatably received in the bore in the edge of the first element, and an eccentric cam fixedly mounted on the shaft is employed to engage the upper wall of the slot in the second element to raise the second element to its release position in response to manual rotation of the cam.

The brake assembly is self contained and complete in and of itself.

Other objects and features of the invention will become apparent by reference to the following specification and to the drawings.

IN THE DRAWINGS

Figure 1:
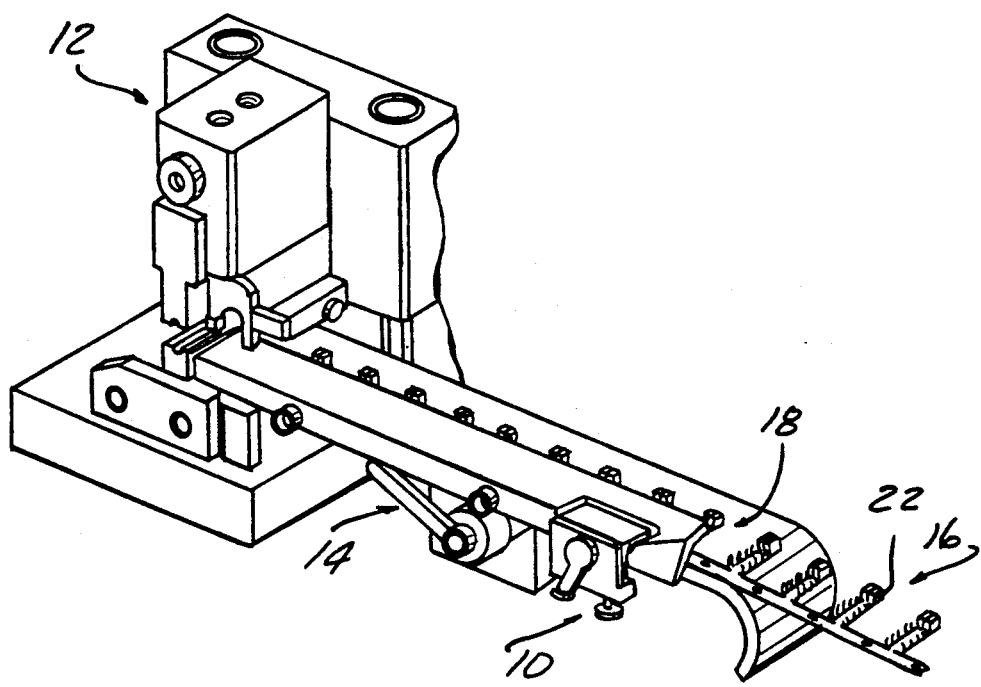
FIG. 1 is a perspective view of a crimping die and feed mechanism employing the present invention.

Referring first to FIG. 1, a brake assembly embodying the present invention, designated generally 10, is shown installed on a typical electrical terminal crimping machine which includes a crimping die designated generally 12 and a terminal strip feed mechanism designated generally 14 for feeding an electric terminal strip designated generally 16 to the crimping die 12. Omitted from FIG. 1 is apparatus associated with die 12 for positioning an electrical conductor upon which a terminal is crimped relative to the die. Crimping die 12 and feed mechanism 14, for purposes of the present invention, may be assumed to be of known construction, die 12 may, for example, take the form of that shown in U.S. Pat. No. 4,598,570, while feed mechanism 14 may take the form of that shown in U.S. Pat. No. 3.,977,587 referred to above. Feed mechanism 14 may include a stationary feed table 18 for supporting the strip 16 in movement to die 12. Terminal strip 16 takes the form of a continuous elongate carrier strip 20 having individual electrical terminals 22 integrally formed on strip 20 at uniformly spaced intervals.

Figure 2:
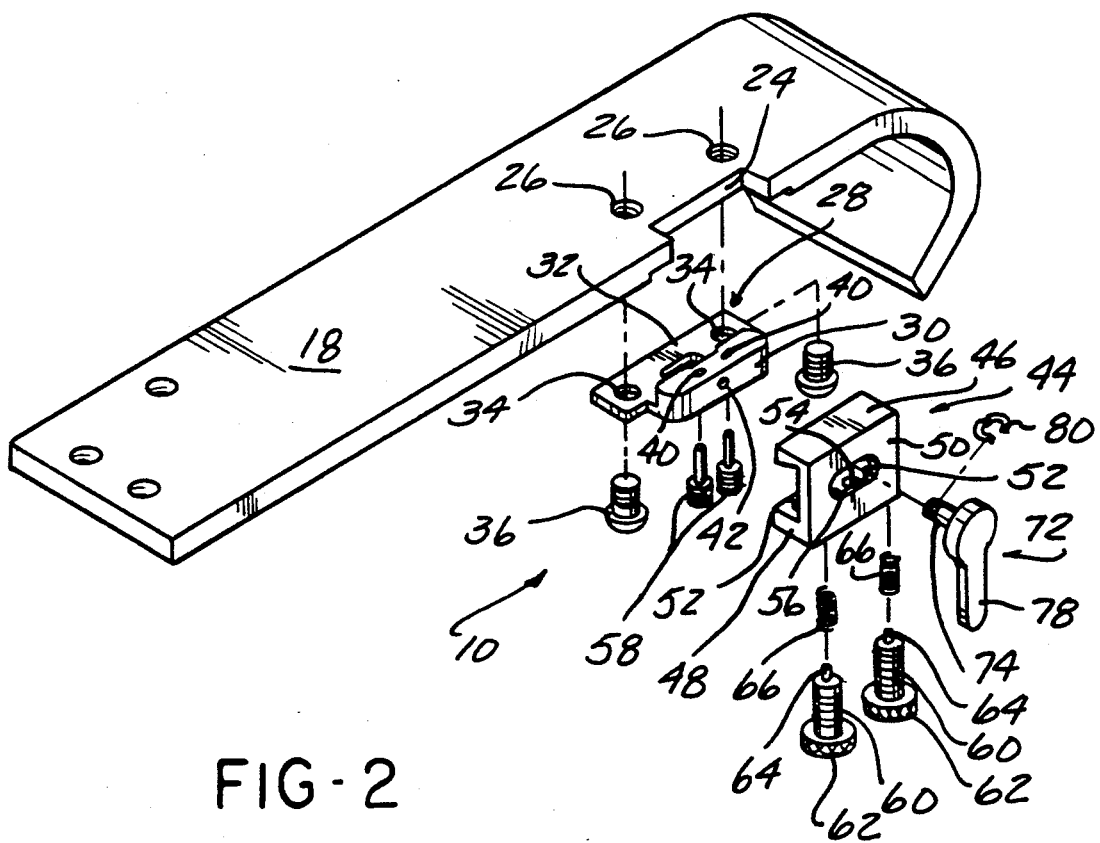
FIG. 2 is an exploded perspective view showing the individual parts of the braking assembly of the present invention and a feed table portion of the assembly illustrated in FIG. 1.

In FIG. 2, the individual parts of brake assembly 10 are shown in an exploded view together with work table 18 of the feed mechanism of FIG. 1. Work table 18 is slightly modified from its conventional form to accommodate brake assembly 10 by the formation of a clearance recess 24 in one edge of the table and a pair of tapped bores 26.

In accordance with the present invention, brake assembly 10 includes a first brake element 28 having a body portion 30 integrally joined to a flat mounting flange portion 32. A pair of bores 34 through mounting flange portion 32 enable the first braking member 28 to be fixedly mounted upon work table 18 by mounting screws 36 which pass through bores 34 and are threaded into tapped bores 26 in table 18 to clamp mounting flange portion 32 against the underside of work table 18. When the first brake element 28 is so mounted upon work table 18, its body portion 30 is disposed within recess 24 of table 18 with its upper surface 38 flush with the top surface of work table 18. Body portion 30 is also formed with two vertical bores 40 and a horizontal bore 42 for purposes to be explained below.

Figure 3:
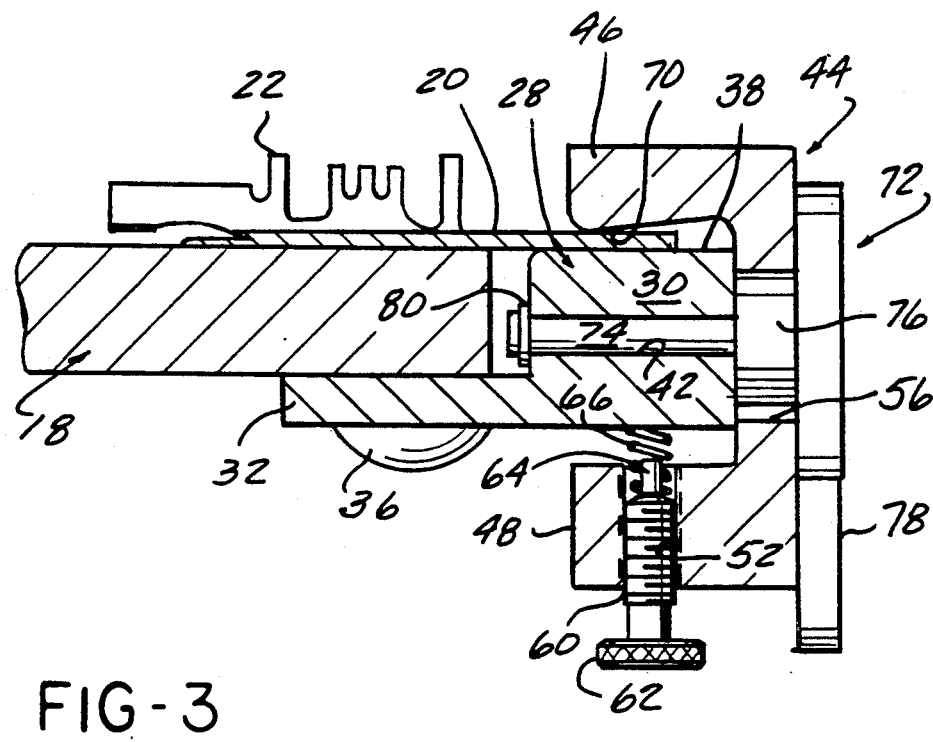
FIG. 3 is a front elevational view of the brake assembly of the present invention, with certain portions of a feed table upon which the assembly is mounted and an electric terminal strip shown in broken line.
Figure 4:
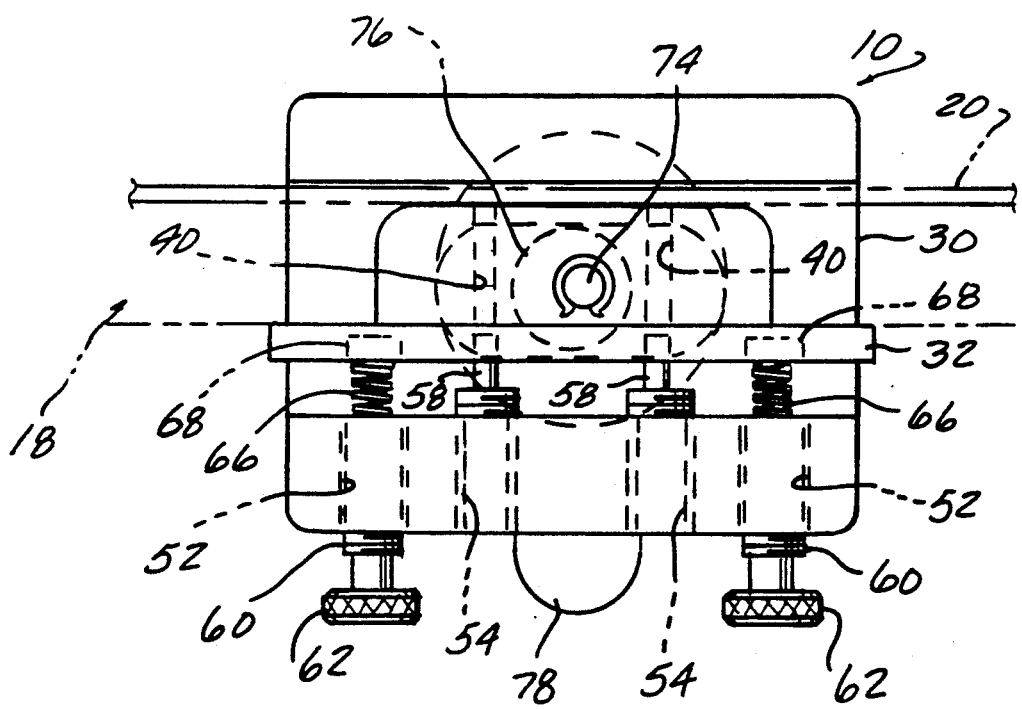
FIG. 4 is a cross sectional view taken on line 4—4 of FIG. 3, again with portions of the work table and a terminal strip indicated in broken line.

A second braking element designated generally 44 is formed with vertically spaced generally horizontal upper 46 and lower 48 webs integrally joined to and projecting from one side of a vertical web 50. As best seen in FIGS. 3 and 4, lower web 48 is formed with two relatively large diameter tapped bores 52 and a second pair of tapped bores 54 of somewhat smaller diameter. Vertical web 50 of second braking member 44 is formed with a horizontally elongate slot 56, best seen in FIG. 2.

Guide pins 58 are threadably received in tapped bores 54 of lower web 48 of member 44 and project upwardly from web 48, as best seen in FIG. 3, to be slidably received within bores 40 in body portion 30 of the first braking member 28. Guide pins 58 are conveniently formed from conventional set screws by grinding a portion of the threads at one end of the set screw to form smooth sided cylindrical pin sections which are slidably received in bores 40. Pins 58 are installed by threading them upwardly through bores 54; once the pins are received in bores 40 of the first braking member 28, the engagement between upper web 46 of the second braking member and the top of body portion 30 of the first braking member will retain the two braking members in assembled relationship with each other.

A pair of adjustment screws 60 are threadably received in tapped bores 52 of lower web 48 and formed at their lower ends with enlarged knurled heads to enable manual adjustment of the screws. The opposite end of each screw is formed with a pin-like reduced diameter projection 64 dimensioned to project into one end of a helical compression spring 66 whose opposite end, when the device is assembled, is seated in a spring seat defined by a recess 68 (FIG. 4) in the bottom side of body portion 30 of the first braking element. As best seen in FIG. 4, the compressive force of the springs 66 resiliently biases the second braking member 44 downwardly relative to the fixed first braking member 28, thus urging the lower surface of upper web 46 of the second braking member 44 downwardly toward the facing opposed top surface 38 of the first braking member. As best seen in FIG. 4, the carrier strip 20 of the terminal strip 16 is frictionally gripped between the opposed surfaces 38 and 70 of the respective first and second braking members, and the frictional force of this braking action can be readily adjusted by adjustment of screws 62 to increase or decrease the biasing force of springs 66.

A release cam designated generally 72 includes, as best seen in FIG. 4, a shaft 74, a circular cam 76 fixedly mounted in eccentric relationship upon shaft 74, and an actuating lever 78. The shaft, cam and lever may be either integrally formed or assembled from separate elements fixed to each other. As best seen in FIG. 4, cam shaft 74 is rotatably received in bore 42 in the body portion 30 of first brake element 28 while the circular periphery of the eccentric cam 76 is located between the upper and lower walls of slot 56 in the second brake member 44. A C-clip 80 retains cam shaft 74 against withdrawal from bore 42. Rotation of the eccentric cam by manual operation of lever 78 may be employed to elevate the second brake member 44 relative to first brake member 28 as the high point of the cam engages the upper wall of slot 56. This shifts the second brake member 44 upwardly from the position shown in FIG. 4 to disengage the lower surface 70 of its upper web from carrier strip 20.

While the brake assembly 10 has been described as being applied to an electric terminal crimping machine, it is believed apparent that the disclosed braking assembly is well adapted for use in other applications in which the movement of elongate strip-like elements require the application of a braking force to control their movement.

While one embodiment of the invention has been described in detail, it will be apparent to those skilled in the art the disclosed embodiment may be modified. Therefore, the foregoing description is to be considered exemplary rather than limiting, and the true scope of the invention is that defined in the following claims.

What is claimed is:

1. A brake assembly for applying a braking force to an elongate strip being moved longitudinally along a fixed first path, said elongate strip having a plurality of individual electrical terminals connected to at least one continuous elongate carrier, the brake assembly comprising:

a first brake member mounted at a fixed location on said first path in sliding engagement with one side of said continuous elongate carrier, said first braking member including a body portion having opposed sides, one of said sides of said body portion being a flat surface in slidable engagement with said one side of said continuous elongate carrier;

a second brake member mounted on said first brake member for movement relative to said first brake member between a braking position, wherein said second brake member slidably engages the opposite side of said continuous elongate carrier to frictionally grip said continuous elongate carrier between said first and second brake members while allowing passage of said plurality of individual electrical terminals without engagement by said first and second brake members, and a release position wherein said second braking member is disengaged from said opposite side of said continuous elongate carrier, said second braking member including a first web portion having a braking surface on one side of said first web portion located in opposed facing relationship to said one of said sides of said body portion and a second web portion located in spaced opposing facing relationship to the other of said opposed sides of said body portion, wherein said second brake member further includes a third web portion joining said first and second web portions to each other in opposed relationship to an edge of said body portion, means defining aligned openings in said edge of said body portion and through said third web portion, one of said openings being a bore having an axis normal to the general plane of said third web portion and the other of said openings being a slot elongated in a direction parallel to said first path;

guide means engaged between said first and second brake members for guiding said second brake member in movement relative to said first brake member;

adjustable spring means engaged between said first and second brake members for biasing said second brake member toward said braking position, said spring means including compression spring means engaged between said second web portion and said opposite side of said body portions; and release cam means engaged between said first and second brake members for moving said second brake member from said braking position to said release position, said release cam means including a shaft rotatably received in said bore and a cam fixedly and eccentrically mounted on said shaft within said slot.

2. The assembly of claim 1 wherein said compression spring means comprises a screw threadably received in said second web portion, a compression spring seated at one end of said screw, and a spring seat at said other side of said body portion receiving the other end of said spring.

3. A brake assembly for applying a braking force to an elongate strip being moved longitudinally along a fixed first path, said elongate strip having a plurality of individual electrical terminals connected to a continuous elongate carrier, said brake assembly comprising:

a first brake member mounted at a fixed location on said path in sliding engagement with one side of said elongate carrier, said first braking member including a body portion having opposed sides, one of said sides of said body portion being a flat surface in slidable engagement with said one side of said elongate carrier;

a second brake member mounted on said first brake member for movement relative to said first brake member between a braking position, wherein said second brake member slidably engages the opposite side of said elongate carrier without engaging said individual electrical terminals to frictionally grip said elongate carrier between said first and second braking members, and a release position wherein said second braking member is disengaged from said opposite side of said elongate carrier, said second braking member including a first web portion having a braking surface on one side of said first web portion located in opposed facing relationship to said one of said sides of said body portion and a second web portion located in spaced opposed facing relationship to the other of said opposed sides of said body portion, and a third web portion joining said first and second web portions to each other in opposed relationship to an edge of said body portion;

guide means engaged between said first and second brake members for guiding said second brake member in movement relative to said first brake member, said guide means including at least one guide pin fixedly mounted on one of said second web portion and said body portion and slidably received in a guide pin bore in the other of said second web portion and said body portion for guiding said second brake member in movement between said braking position and said release position along a fixed second path normal to said first path;

adjustable spring means engaged between said first and second brake members for biasing said second brake member towards said braking position, said spring means including a compression spring means engaged between said second web portion and said opposite side of said body portion, said compression spring means including a screw threadably received in said second web portion, a compression spring seated at one end of said screw, and a spring seat on said other side of said body portion receiving the other end of said compression spring; and release cam means engaged between said first and second brake members for moving said second brake member from said braking position to said release position, said release cam means including aligned openings in said edge of said body portion and through said third web portion, one of said openings being a bore having an axis normal to the general plane of said third web portion and the other of said openings being a slot elongated in a direction parallel to said first path, and a shaft rotatably received in said bore and a cam fixedly and eccentrically mounted on said shaft within said slot.

* * * * *